Aug. 20, 1963
R. T. TRIER ETAL
3,100,924
WIRE ROPE FITTINGS
Filed Jan. 19, 1961
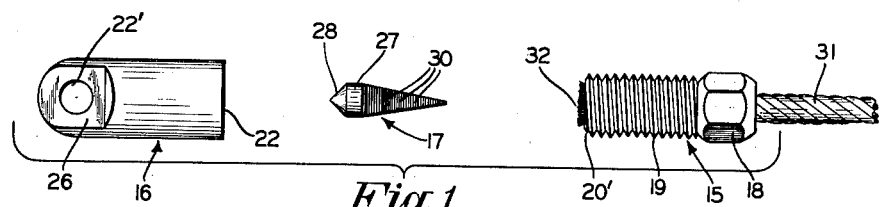
Fig. 1
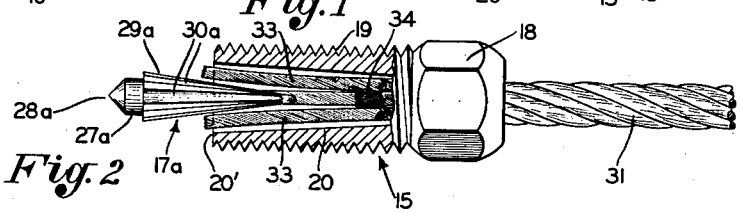
Fig. 2
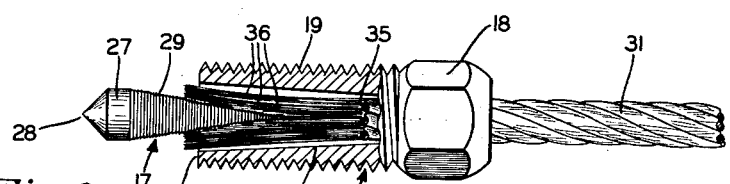
Fig. 3
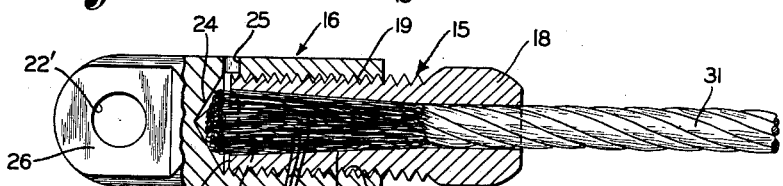
Fig. 4
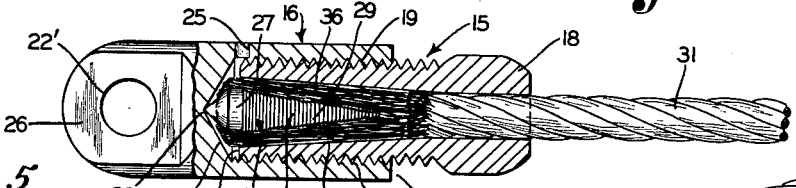
Fig. 5
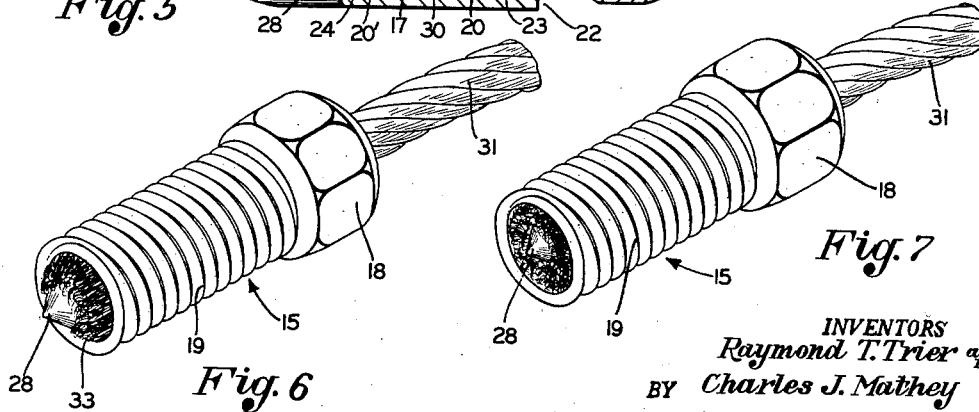
Fig. 6
Fig. 7
INVENTORS
Raymond T. Trier and
BY Charles J. Mathey
Frease, Bishop, Johns & Schick
ATTORNEYS

United States Patent Office 3,100,924
Patented Aug. 20, 1963

3,100,924
WIRE ROPE FITTINGS
Raymond T. Trier and Charles J. Mathey, Canton, Ohio, assignors, by mesne assignments, to The Union Metal Manufacturing Company, Canton, Ohio, a corporation of Ohio
Filed Jan. 19, 1961, Ser. No. 83,702
1 Claim. (Cl. 24—122.6)

The invention relates to wire rope fittings and more particularly to a fitting comprising a sleeve which slips over the end of a wire rope, a plug which is inserted to separate and hold the strands of wire and individual wires of the strands in the sleeve, and a socket member into which the sleeve is screwed for locking the end of the wire rope therein.

The socket member may be provided in various external forms so as to adapt it for use in a variety of different types of wire rope fittings such as eye socket assemblies, clevis socket assemblies, stud socket assemblies, coupling assemblies, clevis and socket turnbuckles, double socket assemblies, hook socket assemblies, etc.

In wire rope fittings of this general character as made prior to our invention, it was necessary, after insertion of the plug between the separated strands in the sleeve, that the plug be driven tightly into place. It was also necessary that the wire strands project a considerable distance beyond the end of the plug and that they could then be closed together beyond the end of the plug before the socket member is applied.

Furthermore, the socket in the socket member was provided with an extension of reduced diameter into which the ends of the strands were received. It was also necessary to provide different forms of plugs for use with hemp-center wire rope and wire-center wire rope.

It is, therefore, a primary object of the invention to provide wire rope fittings which overcome the above described disadvantages and difficulties of prior practice.

Another object of the invention is to provide a wire rope fitting of the character referred to in which the plug is driven tightly between the separated strands of wires of the strands in the sleeve by screwing of the sleeve into the socket member.

A further object of the invention is to provide such a wire rope fitting in which it is not necessary to close the ends of the strands together beyond the end of the plug before application of the socket member.

Another object of the invention is to provide a wire rope fitting of the character referred to in which no reduced extension of the socket is required to receive the ends of the wires or wire strands.

A further object of the invention is to provide such a wire rope fitting in which the end of the socket and the end of the plugs are shaped so that the plug is driven tightly home by the screwing action of the socket member.

A still further object of the invention is to provide a wire rope fitting of this character in which the plug is tapered at a slightly greater angle than the interior of the sleeve so as to increase the wedging action upon the wire strands at the inner end of the sleeve.

The above objects together with others which will be apparent from the drawing and following description, or which may be later referred to, may be attained by constructing the improved wire rope fitting in the manner hereinafter described in detail and illustrated in the accompanying drawing.

In general terms, the invention may be described as a wire rope fitting composed of three parts, namely, a sleeve, a socket member and a tapered plug. The sleeve has a tapered internal bore with an exterior head of hexagonal or similar shape at one end for application of a wrench.

The socket member has an internally threaded socket, open through one end thereof, for receiving the threaded sleeve, the inner end of the socket being shaped as in usual practice, as for example as by the end of the drill bit with which the bore is formed.

The plug is tapered at a slightly greater angle than the tapered interior of the sleeve and has a cylindrical head at its larger end, and the end of the head may be shaped similar to the inner end of the socket in the socket member. The tapered plug for wire center rope is preferably provided with annular serrations to assist in biting into the wires of the wire rope. The tapered plug for hemp-center rope is preferably provided with longitudinal grooves to receive the wire strands of the rope.

In using the improved wire rope fitting upon a wire-center rope, one end of the wire rope is inserted through the sleeve so as to protrude a slight distance beyond the end thereof and the outer strands of the wire rope are separated and fanned out. Then all wires of the outer strands and the inner strands are broomed out.

If a hemp-center wire rope is used, the hemp center strand is cut away within the sleeve, and the outer strands are unlaid and spaced evenly within the sleeve. In either case, the plug is then inserted centrally into the unlaid strands or broomed out wires of the strands of the wire rope and partially into the sleeve but it is not necessary that the plug be driven or firmly pressed therein.

The plug is pressed into the center of the rope with finger pressure. The sleeve is then screwed into the socket until the plug is visible through the inspection hole therein. Then the wire rope is pushed past the plug until its wires can be seen in the inspection hole.

The plug is screwed one full turn on the sleeve while the operator observes through the inspection hole to be sure that the strands or wires, as the case may be, are uniformly spaced, thereby indicating that the plug is still centered.

The socket is then tightened onto the sleeve to a reasonable tightness. Twisted wires visible through the inspection hole at this time indicate that a good assembly has been completed.

As the sleeve is thus threaded into the socket member, if the socket and cone are properly shaped, the screwing action will center and drive the plug tightly into place by contact of the shaped head of the plug with the shaped end of the socket, clamping the strands, or wires thereof, of the wire rope tightly between the tapered plug and the tapered internal bore of the sleeve.

Since the taper upon the plug is slightly greater than that of the interior of the sleeve, it will be seen that the greatest clamping action upon the strands will be between the head end of the plug and the inner end of the sleeve.

When the fitting is thus assembled, the twisted wires or strands are visible through the inspection opening in the socket member permitting visual inspection to insure correct attachment. When the assembly is placed under tension, as frequently occurs in usual use, the rope and plug will be pulled to the ultimate of the rope, producing further seating of the plug within the sleeve.

Having thus briefly described the invention, reference is now made to the accompanying drawing, in which;

FIG. 1 is an exploded elevation of the sleeve, plug and socket member, showing one end of a wire rope inserted through the sleeve with the strands of the wire rope fanned out through the inner end of the sleeve;

FIG. 2 is an enlarged, longitudinal sectional view through the sleeve with one end of a hemp-center wire rope inserted therethrough, the inner hemp-center strand being cut away within the sleeve and the outer wire strands being unlaid and extended slightly through the inner end of the sleeve, showing the plug inserted therein;

FIG. 3 is an enlarged, longitudinal sectional view through the sleeve, showing a wire-center rope inserted therethrough, the wires of all of the strands of the wire rope being broomed out and extended slightly through the inner end of the sleeve;

FIG. 4 is an enlarged, longitudinal sectional view through an eye socket assembly embodying the invention, showing the parts in assembled position with the end of a wire rope clamped therein;

FIG. 5 is a view similar to FIG. 4 with a portion of the outer wire strands broken away to show the tapered plug driven home therein;

FIG. 6 is a perspective view of the sleeve with the end of a wire rope clamped therein, removed from the socket member after the plug has been driven home by the screwing action; and, FIG. 7 is a view similar to FIG. 6, showing the further seating of the plug that occurs after the assembly is placed in tension.

Referring now more particularly to the embodiment of the invention illustrated in FIGS. 1 to 7, in which similar numerals refer to similar parts throughout, the invention is illustrated as applied to an eye socket assembly.

The wire rope fitting shown in this embodiment of the invention comprises the sleeve indicated generally at 15, the socket member indicated generally at 16 and the tapered plug indicated generally at 17.

The sleeve 15 is of generally cylindrical shape, having an enlarged head 18, of hexagonal or other suitable shape, at its outer end for application of a wrench. The remainder of the exterior of the sleeve is screw threaded as indicated at 19. The sleeve is provided with a longitudinal bore 20 tapered from the end 20' toward the head 18 thereof.

The socket member 16 may be generally cylindrical in cross section, as shown in FIG. 1, or may be square, hexagonal or other cross-sectional shape as desired, the exterior contour of the socket being immaterial to the present invention.

As best shown in FIGS. 4 and 5, an internally threaded longitudinal bore 23 is formed through the inner end 22 of the socket member and terminates within the socket member in the preferably slightly coned end wall 24 formed as in usual practice by the drill with which the bore is formed.

An inspection opening 25 is located through one side of the socket member, communicating with the end of the bore therein. The outer end of the socket member may have any desired conformation, depending upon the type of assembly in which it is to be used.

In the form of the invention shown in FIGS. 1, 4 and 5 in which an eye-socket assembly is shown, the outer end of the socket member 16 has a centrally located, outwardly disposed ear 26 formed thereon with aperture 22' therein for receiving a bolt or the like for anchoring the fitting to any desired support member.

The plug 17, especially designed for use with wire-center rope, has a cylindrical head 27 at its larger end, the end of said head being preferably coned as at 28, similar to the coned end 24 of the socket in the socket member 16, but tapered more than the coned end 24, as best shown in FIGS. 4 and 5. The body portion 29 of the plug is tapered at a slightly greater angle than the tapered bore 20 of the sleeve and is provided throughout its length with the annular serrations 30.

The plug indicated generally at 17a in FIG. 2 is especially designed for use with hemp-center wire rope. The body portion 29a of this plug is tapered at a slightly greater angle than the tapered bore 20 of the sleeve, and is provided with the longitudinal grooves 30a. The cylindrical head 27a may be of reduced diameter and may have the coned end 28a.

In assembling the wire rope fitting, one end of a wire rope 31 is inserted through the tapered bore 20 of the sleeve 15 from the head end thereof, the end of the wire rope protruding a short distance through the inner end 20' of the sleeve, the strands of the wire rope being fanned out through one end of the sleeve, as indicated at 32 in FIG. 1.

If the wire rope is a hemp-center rope, as shown in FIG. 2, after the outer strands 33 at one end of the rope are unlaid, the end of the hemp-center 34 is cut off as shown, and this end of the rope is inserted into the sleeve 15, with the ends of the wire strands 33 extending slightly through the end 20' of the sleeve. The tapered plug 17a is then inserted into the laid-out wire strands 33 within the sleeve, as shown in FIG. 2, the wire strands being received in the grooves 30a of the plug.

In the event the wire rope is a wire-center rope, as shown in FIG. 3, all of the strands of the rope are separated and broomed out as indicated at 36, and this end of the wire rope is inserted through the sleeve 15 with the ends of the broomed-out wires 36 extending through the end 20' of the sleeve. The plug 17 may then be inserted as shown in FIG. 3.

It is not necessary that the tapered plug be driven into the sleeve in either case, but it is only pressed into the center of the rope by finger pressure. All that is necessary is that the laid-out strands of the wire rope or the broomed-out wires thereof, as the case may be, be pressed toward the tapered plug sufficiently to permit the same to enter the threaded bore 23 in the socket member 16.

The sleeve is started into the socket until the plug is visible through the inspection hole 25 in the socket. The wire rope is then pushed inwardly until its wires can be seen through the inspection hole. The socket is then given one full turn of the sleeve while the operator looks through the inspection hole to be certain that the wires are uniformly spaced, thereby indicating that the plug is still centered.

By means of a wrench or similar tool applied to the head 18, the sleeve 15 is then screwed into the threaded socket 23 to a reasonable tightness. As the sleeve is thus screwed into the socket member the tapered plug will be driven home by contact of the coned head 28 thereof with the coned end 24 of the socket, wedging the laid-out outer strands 33 of the wire rope as in FIG. 2, or the broomed-out wires 36 of the strands as in FIGS. 3 to 5, tightly between the tapered plug and the tapered bore 20 in the sleeve, as shown in FIGS. 4 and 5. Twisted wires visible through the inspection hole indicate a good assembly.

Due to the differential in taper between the plug 17 or 17a and the bore 20 of the sleeve, it will be seen that the greatest clamping action is between the larger end of the tapered plug and the larger end of the tapered bore 20 near the inner end 20' of the sleeve.

The wire rope is thus firmly clamped within the fitting, which has greater holding power than in prior practice. The completeness and permanence of the connection may be easily checked through the inspection opening 25.

In FIG. 6 is shown the sleeve with wire rope clamped therein, removed from the socket member after the plug has been driven home by the screwing action.

In FIG. 7 is shown the sleeve with wire rope clamped therein, which has been removed from the socket after the assembly has been placed under tension, showing the further seating of the plug that occurs under tension. Thus it will be evident that tension upon the asembly, up to the ultimate of the wire rope, results in further seating of the plug and tighter wedging of the rope within the sleeve.

From the above it will be obvious that a simple, inexpensive and efficient wire rope clamping means is provided which may be easily and readily applied to a wire rope, under obseravtion by the operator in order to assure a proper assembly. It will also be seen that the improved clamping means is applicable to a variety of different types of wire rope fittings.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claim.

We claim:

A wire rope fitting of the character described comprising a socket member having an internally threaded bore open through one end thereof and terminating in a conical end wall spaced from the other end thereof, an externally threaded sleeve for screwing into said bore, said sleeve having a bore tapered from its inner end toward its outer end for insertion of a wire rope with the strands thereof separated and fanned out through its inner end, and a tapered plug for insertion between the separated strands of the wire rope, the larger end of said tapered plug being completely conical and of a greater taper than said conical end wall of the bore in the socket member so that it is adapted to have only point contact with the conical end wall of the bore in the socket member for driving the plug into the separated fanned-out strands of the wire rope and clamping them within the tapered bore of the sleeve by the screwing action.

References Cited in the file of this patent

UNITED STATES PATENTS

| | | |
|---|---|---|
| 1,094,668 | McBride | Apr. 28, 1914 |
| 1,197,073 | Smith | Sept. 5, 1916 |
| 1,466,127 | Gottschalt | Aug. 28, 1923 |
| 1,855,227 | Fiege | Apr. 26, 1932 |
| 1,953,290 | Daniel | Apr. 3, 1934 |
| 1,958,747 | Fiege | May 15, 1934 |
| 2,016,856 | Fiege | Oct. 8, 1935 |
| 2,017,887 | Blackburn | Oct. 22, 1935 |

FOREIGN PATENTS

| | | |
|---|---|---|
| 332,127 | Great Britain | July 17, 1930 |
| 332,729 | Great Britain | July 31, 1930 |